Patented Nov. 18, 1947

2,431,251

UNITED STATES PATENT OFFICE 2,431,251

ANION EXCHANGE RESIN PREPARED WITH UREA, PARAFORMALDEHYDE, AND ANILINE HYDROCHLORIDE AND PROCESS OF REMOVING ACIDS FROM LIQUIDS THEREWITH

Eric Leighton Holmes, London, England, assignor to The Permutit Company, New York, N. Y., a corporation of Delaware No Drawing. Application February 2, 1944, Serial No. 520,795. In Great Britain February 4, 1943

3 Claims. (Cl. 210—24)

Acid-removal or anion-exchange properties are possessed by organic materials that contain free basic groups, so that any such material that can be produced in a water-insoluble granular form can be used as a filter bed for the purpose of removing acid present in small quantities in water. The precise mechanism by which the removal is effected is uncertain, as although it may be represented by an exchange of hydroxyl ions for the anions of the acid, it may result from a change of the nitrogen in the basic groups from trivalency to pentavalency, the nitrogen then taking up hydrogen and the anion of the acid. Whatever the mechanism, the material, when exhausted, can be regenerated by treatment with a dilute solution of an alkali. This same treatment may be applied to a material that when produced contains basic groups combined with an acid and so is in salt rather than basic form.

Now the condensation products of amides with aldehydes, of which the urea-formaldehyde resins are the best known, have no acid-removal or anion-exchange properties. The present invention is based on the discovery that remarkably good properties of this kind can be produced in certain amide-aldehyde condensation products. These are the products formed by condensing an aliphatic mono- or poly-amide such as urea with an aldehyde and with or without a secondary substance also capable of condensing with the aldehyde, and the invention consists broadly in decomposing amide groups in the condensation product to yield basic groups, either free or combined with an acid. The initial condensation product may be soluble or insoluble in water and the decomposition may in the former case be effected in the solution which results from the condensation reaction. Moreover, the initial condensation product may be resinous or nonresinous, in the latter case being crystalline, semicrystalline or in solution. If it is desired to make the initial product resinous and water-insoluble and the amide and aldehyde when used alone yield a water-soluble product, a secondary substance, e. g., aniline, which has the property of producing an insoluble resin on condensation with an aldehyde may be included in the initial condensation reaction. If the initial product is water-soluble and the decomposition is effected in solution, a further condensation reaction may be carried out (after the decomposition) with formaldehyde and such a substance as aniline that is capable of forming a water-insoluble condensation product with formaldehyde alone, so as to produce a water-insoluble material. Naturally this further condensation reaction can be carried out before the decomposition, but this involves an extra step in comparison with the method in which aniline or the equivalent is included in the initial reaction and only produces the same result. The step of carrying out a further condensation reaction may also be employed if, as sometimes happens, the amide decomposition renders an insoluble resin soluble or partly soluble, particularly in acids. In short, if the material, from whatever cause, is soluble in water after the decomposition, a further condensation reaction may be carried out. Naturally at whatever stage aniline (which may be used in the form of aniline hydrochloride) or the equivalent of aniline is used, enough of it must be taken to impart an insoluble structure to the whole of the final resin.

The decomposition of an amide group of the kind in question involves the breakage of the linkage between the nitrogen atom or atoms and a >C=O group. The decomposition may be effected by hydrolysis, oxidation or heat-treatment. Hydrolysis may easily be effected by boiling in a solution of an acid, and in such a case the basic groups will be in the combined form in the resultant material. Care should be taken not to use more acid than is necessary, as any excess may cause the final material partly to liquefy or froth while it is being dried. Although an acid is preferred, any other hydrolysing agent, e. g. a caustic soda solution, may be used. If the amide group is —NHCOR the acid RCOOH will be formed and will split off.

If aniline hydrochloride or other acid substance is used to render a soluble condensation product insoluble, hydrolysis of the amide groups can be effected by boiling with this instead of using a separate acid for the purpose, or part of the acid may be replaced by the aniline hydrochloride or the like.

The preferred process comprises using urea as the aliphatic amide, boiling the condensation product in aniline hydrochloride solution to effect decomposition of amide groups by hydrolysis, further condensing the hydrolysed product with formaldehyde, and decomposing further amide groups in the product of this second condensation reaction, the product preferably being dried before the second decomposition treatment.

Some examples of processes according to the invention are given below.

Example I

This is an example of the production of a water-insoluble resin with the decomposition of amide groups in it by hydrolysis. 20 grams of Quebracho tannin and 40 grams of urea were dissolved in 50 ccs. of warm water. 40 grams of paraformaldehyde and 10 ccs. of 10% caustic soda were then added with continued stirring and after 1¼ hours at 70° C. the material set to a hard gel. When this was dried it has no anion-exchange properties. When, however, this dried product was boiled for 2 hours in 20% hydrochloric acid solution there was considerable evolution of gas and the product was then found to possess appreciable acid-absorbing properties after regeneration with an alkali.

Example II

This is another example of the decomposition of amide groups by hydrolysis in a water-insoluble resin. 28 grams of aniline and 30 ccs. of concentrated hydrochloric acid solution were dissolved in 140 ccs. of water. 14 grams of acetamide were then added and when this was dissolved 60 ccs. of 40% formaldehyde were added. Heating to 50° C. caused the mass to set to a gel, which was then dried. During the drying the smell of acetic acid was observed, and the product was found to possess appreciable anion-exchange properties, which were improved by boiling the solid product in hydrochloric acid for three hours.

Example III

This is an example of the production of a water-insoluble resin, the decomposition of amide groups in it by hydrolysis with resultant loss of insolubility, and the carrying out of a second condensation reaction. 46 grams of aniline and 46 ccs. of concentrated hydrochloric acid were added to 500 ccs. of water in which 30 grams of urea had been dissolved. 90 ccs. of 40% formalin were added, and after the material had been allowed to stand for 12 hours a further 100 ccs. of 40% formalin were added, whereupon the material set to a gel, which was dried. A sample of it was found to possess very slight ion-exchange properties after treatment with an alkali. This resin was boiled with twice its weight of 20% hydrochloric acid for half an hour, when it entirely dissolved. An equal weight of aniline hydrochloride was added to the solution, which was then diluted with twice its bulk of water, and an amount of 40% formaldehyde equal to half the total solution thus obtained was added. A compact gel was formed in a few minutes, and yielded a material of good acid-absorbing properties after being dried and regenerated with an alkali.

Example IV

This is an example of the decomposition of amide groups in an intermediate condensation product. 3 kilograms of urea and 3.7 litres of formalin were allowed to stand for 4 hours, at the end of which the mixture had set to a hard mass of methylene urea, a microcrystalline body. 14 kilograms of aniline hydrochloride and 30 litres of water were added and boiled for two hours to bring about decomposition of amide groups by hydrolysis. The resultant solution was cooled to 30° C. and a second condensation reaction was then effected by adding 16 litres of formalin, whereupon the mixture set to a hard gel, which was dried at a temperature below 100° C. and then had acid-removal properties.

Example V

This is a modification of Example IV. Instead of using aniline hydrochloride to effect the hydrolysis, the methylene urea is boiled with 20% hydrochloric acid, and the second condensation reaction is then carried out with aniline hydrochloride and formaldehyde.

Example VI

This is a modification of Examples IV and V in which the initial non-resinous condensation product is formed by using acetaldehyde instead of formalin. 20 grams of urea and 10 grams of acetaldehyde were dissolved in 50 ccs. of water and the solution was heated to 50° C. and allowed to stand. In three hours a white substance began to separate out and after twenty four hours 10 grams of this was obtained. This quantity was boiled for one hour with 50 grams of aniline hydrochloride in 100 ccs. of water and cooled to 40° C. and 100 ccs. of 40% formalin were then added. A gel formed in a few minutes and was heated for sixteen hours at 120° C. It was then found to have an exchange capacity of 25 kilograins per cubic foot.

Example VII

This in an example of a second condensation reaction after one decomposition step, the drying of the product of the second condensation reaction, and the application of heat treatment to the dried product to effect more decomposition. 100 grams of urea, 100 grams of paraformaldehyde, 500 ccs. of water and 5 ccs. of concentrated ammonia were boiled together for 3 hours and yielded a water-soluble intermediate condensation product in solution. Decomposition was effected in solution by hydrolysis, 400 ccs. of concentrated hydrochloric acid being first added, and the mixture boiled for 3½ hours, and 600 grams of aniline hydrochloride being then added and the boiling continued for 2 hours more. The solution was then allowed to cool and next mixed with 800 ccs. of formalin to form a gel, which was dried at 80° C. and was found to have an exchange capacity of 1.5 kilograins per cubic foot. A further specimen of the same material was heated to 140° C. for 1 hour after the drying and was then found to have a capacity of 8 kilograins per cubic foot under the same conditions of test.

Example VIII

This is a modification of Example VII in which the hydrolysis is effected entirely by means of aniline hydrochloride without any addition of acid. The intermediate condensation product of Example VII was mixed with 600 grams of aniline hydrochloride dissolved in a litre of water and the mixture was boiled for 2 hours. The product obtained by adding 800 ccs. of 40% formalin to such a boiled mixture was dried at 120° C. and found to have an exchange capacity of 6 kilograins per cubic foot.

The resins produced as described herein may be employed in the usual anion-exchange and acid-removal processes. For example, a bed of resin granules may be placed in a tank provided with suitably valved inlet and outlet connections. An acid solution such as the effluent from an acid-regenerated cation exchange unit may be passed through the bed of anion exchange resin either upwardly or downwardly. The flow of such acid solution is interrupted when the anion exchange resin has become saturated and permits acid to pass through the outlet. The bed may then be backwashed and regenerated by passing through it a solution of an alkali. After suitable rinsing, a further quantity of acid solution may then be passed through the bed. This cyclic process may be repeated over and over.

By the term "anion exchanger" as used herein I mean a substance substantially insoluble in dilute aqueous solutions of acids or bases which has the ability to remove acids from solutions and which can be regenerated with an alkali solution to restore its acid removal capacity. The term "anion exchange resin" may refer to either the base or salt form, since these forms are reversibly inter-changeable by a simple treatment with acid or alkali solutions.

The terms and expressions which I have employed are used as terms of description and not of limitation; and in the use of such terms and expressions I mean to include any equivalents of the features shown and described, or portions thereof, and I recognize that various modifications may be made without departing from the spirit of my invention.

Having now particularly described and ascertained the nature of my invention and in what manner the same is to be performed, I declare that what I claim is:

1. A process for preparing an anion exchange resin by condensing 1 part each of urea and paraformaldehyde in water under alkaline conditions to form a water-soluble product, adding 6 parts of aniline hydrochloride dissolved in 10 parts of water, boiling for a period of time sufficient to bring about decomposition of said water-soluble product by hydrolysis, adding 8 parts of 40% formaldehyde solution to form a gel, and drying said gel at 120° C.

2. An anion exchange resin prepared by condensing 1 part each of urea and paraformaldehyde in water under alkaline conditions to form a water-soluble product, adding 6 parts of aniline hydrochloride dissolved in 10 parts of water, boiling for a period of time sufficient to bring about decomposition of said water-soluble product by hydrolysis, adding 8 parts of 40% formaldehyde solution to form a gel, and drying said gel at 120° C.

3. A process of removing acid from liquid by contacting said liquid with an anion exchange resin prepared according to claim 2, and then separating said liquid from said anion exchange resin.

ERIC LEIGHTON HOLMES.

REFERENCES CITED

The following references are of record in the file of this patent:

UNITED STATES PATENTS

| Number | Name | Date |
|---|---|---|
| 1,536,881 | Ellis | May 5, 1925 |
| 2,246,526 | Melof | June 24, 1941 |
| 2,251,234 | Swain | July 29, 1941 |
| 2,328,901 | Grimm | Sept. 7, 1943 |
| 2,246,527 | Melof | June 24, 1941 |
| 2,285,750 | Swain | June 9, 1942 |
| 2,228,514 | Griessback et al. | June 14, 1941 |
| 1,846,853 | Ellis | Feb. 23, 1932 |